US 12,271,370 B2

(12) United States Patent
Zimmerman et al.

(10) Patent No.: US 12,271,370 B2
(45) Date of Patent: Apr. 8, 2025

(54) SYSTEM AND METHOD FOR MATCHING INTO A COMPLEX DATA SET

(71) Applicant: LiveRamp, Inc., San Francisco, CA (US)

(72) Inventors: Adam Zimmerman, Conway, AR (US); Pavan Roy Marupally, Conway, AR (US); Joseph Shannon Duncan, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 18/028,066

(22) PCT Filed: Sep. 28, 2021

(86) PCT No.: PCT/US2021/052407
§ 371 (c)(1),
(2) Date: Mar. 23, 2023

(87) PCT Pub. No.: WO2022/072349
PCT Pub. Date: Apr. 7, 2022

(65) Prior Publication Data
US 2023/0342352 A1 Oct. 26, 2023

Related U.S. Application Data

(60) Provisional application No. 63/085,637, filed on Sep. 30, 2020.

(51) Int. Cl.
*G06F 16/30* (2019.01)
*G06F 16/23* (2019.01)
(Continued)

(52) U.S. Cl.
CPC ...... *G06F 16/2379* (2019.01); *G06F 16/2425* (2019.01); *G06F 16/2468* (2019.01)

(58) Field of Classification Search
None
See application file for complete search history.

(56) References Cited

U.S. PATENT DOCUMENTS 6,049,804 A * 4/2000 Burgess ................ G06F 16/284
6,405,198 B1 * 6/2002 Bitar .................... G06F 16/2282
707/999.005

(Continued)

OTHER PUBLICATIONS

Havens, Timothy C., et al. "Fuzzy c-means algorithms for very large data." IEEE Transactions on Fuzzy Systems 20.6 (2012): 1130-1146. (Year: 2012).*

(Continued)

*Primary Examiner* — Polina G Peach

(57) ABSTRACT

A system and method for efficiently matching into an extremely large data set uses two data stores. A search data store contains identifiers that correspond to localized portions of the main data store, along with matching values for that portion of the main data store. To perform a matching operation, the search data store is first searched for a matching value. Then the identifier for the localized portion of the main data store is retrieved from the search data store. Using this identifier, a search may be performed against only the corresponding localized portion of the main data store rather than the entire main data store.

14 Claims, 3 Drawing Sheets

(51) Int. Cl.
*G06F 16/242* (2019.01)
*G06F 16/2458* (2019.01)

(56) References Cited

U.S. PATENT DOCUMENTS

| | | | |
|---|---|---|---|
| 6,799,190 B1 | 9/2004 | Boothby | |
| 7,076,507 B1 | 7/2006 | Tarin | |
| 8,046,339 B2 | 10/2011 | Chaudhuri et al. | |
| 8,065,264 B1* | 11/2011 | Achanta | G06F 16/2453 707/602 |
| 8,756,237 B2* | 6/2014 | Stillerman | G06F 16/00 707/715 |
| 10,235,376 B2* | 3/2019 | Dickie | G06F 16/24 |
| 11,106,692 B1* | 8/2021 | Guetta | G06F 16/248 |
| 11,269,888 B1* | 3/2022 | Farooq | G06F 16/113 |
| 2003/0033275 A1 | 2/2003 | Alpha et al. | |
| 2003/0217033 A1* | 11/2003 | Sandler | G06F 16/2272 |
| 2006/0080358 A1 | 4/2006 | Blair-Stanek | |
| 2009/0313463 A1 | 12/2009 | Pang et al. | |
| 2010/0257153 A1 | 10/2010 | Day et al. | |
| 2010/0332457 A1* | 12/2010 | Graefe | G06F 16/2228 707/673 |
| 2013/0073586 A1* | 3/2013 | Aubry | G06F 16/2455 707/769 |
| 2013/0124474 A1 | 5/2013 | Anderson | |
| 2013/0124525 A1* | 5/2013 | Anderson | G06F 16/278 707/737 |
| 2015/0019507 A1* | 1/2015 | Aronovich | G06F 16/1748 707/747 |
| 2015/0254308 A1* | 9/2015 | Scott | G06F 16/23 707/780 |
| 2018/0300385 A1* | 10/2018 | Merriman | G06F 16/278 |
| 2019/0095129 A1* | 3/2019 | Fetik | G06F 3/0673 |
| 2021/0110056 A1* | 4/2021 | Ehat | H04L 9/0872 |

OTHER PUBLICATIONS

Fua, Ying-Huey et al., "Hierarchical Parallel Coordinates for Exploration of Large Datasets," VIS '99: Proc. of the Conf. on Visualization '99, pp. 43-50, Oct. 24, 1999).

Supplementary European Search Report for application No. EP21876298 (Sep. 4, 2024).

* cited by examiner

SYSTEM AND METHOD FOR MATCHING INTO A COMPLEX DATA SET

CROSS-REFERENCE TO RELATED APPLICATIONS

This application claims the benefit of U.S. provisional patent application No. 63/085,637, entitled "System and Method for Matching into a Complex Dataset," filed on Sep. 30, 2020. Such application is incorporated herein by reference in its entirety.

BACKGROUND

Data concerning objects may be stored in a graph data structure or data graph. In a data graph, the nodes of the graph are the data elements and the edges are the relationships between the data elements. An identity graph is a special type of data graph used to store and utilize data pertaining to natural persons, households of natural persons, or businesses. Data graphs may, however, be used to store information about any type of object. The edges in a data graph are used to link together data pertaining to the same object. The nodes may include various touchpoints that are associated with the same object, such as, in an identity graph for example, a name, postal address, email address, telephone number, and the like. There also may be "primary" nodes for natural persons or businesses, which link to each associated touchpoint, as well as household nodes. By using the data structure of a graph, all touchpoints related to the same object may be easily identified by following the edges connecting the touchpoint nodes. This structure thus enables a comprehensive understanding of each object for which data is maintained, in a way that makes that data easily and quickly accessible.

In a typical commercial identity graph maintained by a commercial data services provider, a substantial quantity of the data contained within the graph is purchased or contracted for from a large number of data vendors. The data in the identity graph is thus frequently updated or expanded as new data or updated data becomes available. But given the enormous size of these data structures, the updates are computationally expensive. In order to add or update data into the data graph, the data services provider must first find the matching data in the existing graph, if such data exists. In a data graph with millions or billions of nodes and trillions of edges to traverse, what might appear to be a simple matching search quickly becomes computationally infeasible. This is especially true when the new data set being matched against the identity graph may itself contain data concerning millions of objects. Simply going through the entire data set and comparing each record with records extracted from the data graph could not be performed in an amount of time that would make the result meaningful, the data could very well be out of date by the time such an update was complete. In any event, the cost of performing this type of update would make the process impractical.

One approach to speeding up this matching process has been to build specialized lookup indexes, such as might be constructed using the Apache Lucene open-source text search engine library. In certain implementations, the Lucene build was made available through an application programming interface (API) service, which could then be called from a remote location in order to perform the search and match process. Although this improves on the speed of the full data graph search, it still is relatively slow and becomes infeasible when the number of new data sets, and the size of those data sets, passes a certain threshold. What is desired then is an improved data structure system and method that provides feasibly fast matching against extremely large data sets of objects, such as but not limited to data graphs, and in particular identity graphs.

References mentioned in this background section are not admitted to be prior art with respect to the present invention.

SUMMARY

The present invention is directed to a system and method for efficiently matching into an extremely large data set. Two data stores are used. A search data store contains identifiers that correspond to localized portions of the main data store, along with matching values for that portion of the main data store. To perform a matching operation, the search data store is first searched for a matching value. Once that is found, then the identifier for the localized portion of the main data store is retrieved from the search data store. Using this identifier, a search may be performed against only the corresponding localized portion of the main data store rather than the entire main data store. Although this approach is counterintuitive in that two searches must be performed instead of a single search, the method becomes much more efficient than a single search as the size of the main data store becomes extremely large.

The present invention may be employed with respect to data graphs, and in particular to identity graphs. It will be understood, however, that the invention is not so limited, and in fact can be employed with respect to any type of data store whose structure is inherently divisible into localized portions. Non-limiting examples of such data structures include trees, maps, lists, and queues.

These and other features, objects and advantages of the present invention will become better understood from a consideration of the following detailed description of the preferred embodiments in conjunction with the drawings and description, although the invention shall only be limited by the claims in a subsequent nonprovisional application.

DRAWINGS

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
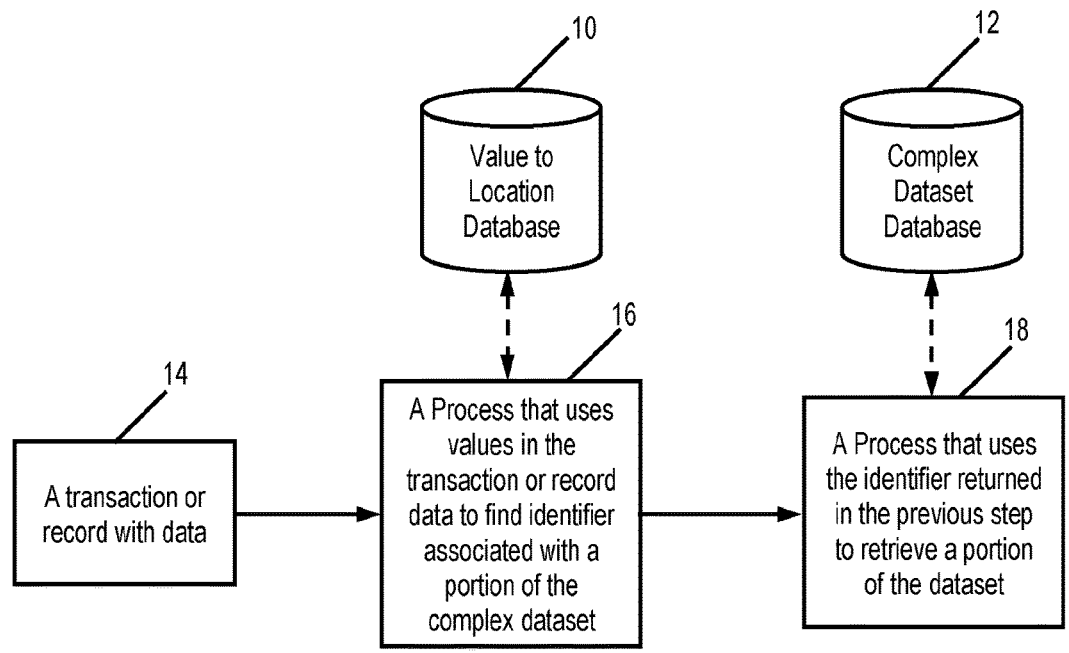
FIG. 1 is a high-level data flow architecture for an implementation of the present invention.

FIG. 1 provides a high-level process flow for the invention. It is implemented as two data stores, in this example being a value-to-location database 10 and a complex data set database 12. The value-to-location database 10 maps values to a particular localized portion of the larger, complex data set database 12. It uses values to look up an identifier where the identifier is related to some segment of a complex dataset. The complex data set database 12 is used to resolve an identifier from value-to-location database 10 into the underlying data of the segment of a complex dataset within complex data set database 12.

Following the flow portion of FIG. 1, a transaction or a record with data is received at receive record step 14. For example, this may be a record for an object that requires matching into the complex data set database. The record may contain multiple fields, each of such fields containing a data item concerning the object about which the record is concerned. For example, the object may be a consumer, and the fields may include a postal address, an email address, a telephone number, and the like. The matching of the record may be needed for adding data to the complex data set database 12, confirming data within the complex data set database 12 or the record, or for retrieving data from the complex data set database 12 that corresponds to the data in the record, as non-limiting examples. The first process then uses values in the transaction or record in order to find the identifier associated with a portion of the complex data set in complex dataset database 12 at find identifier step 16. Once the identifier is retrieved, then the corresponding portion of the complex data set is searched for a match to the transaction or record at match search step 18. Because the entire complex data set need not be searched, the operation proceeds much more quickly when extremely large data sets are presented. The larger the size of the complex data set database, the more efficiency may be gained by this method over a traditional one-step search of the entire complex data set in complex dataset database 12.

Figure 2:
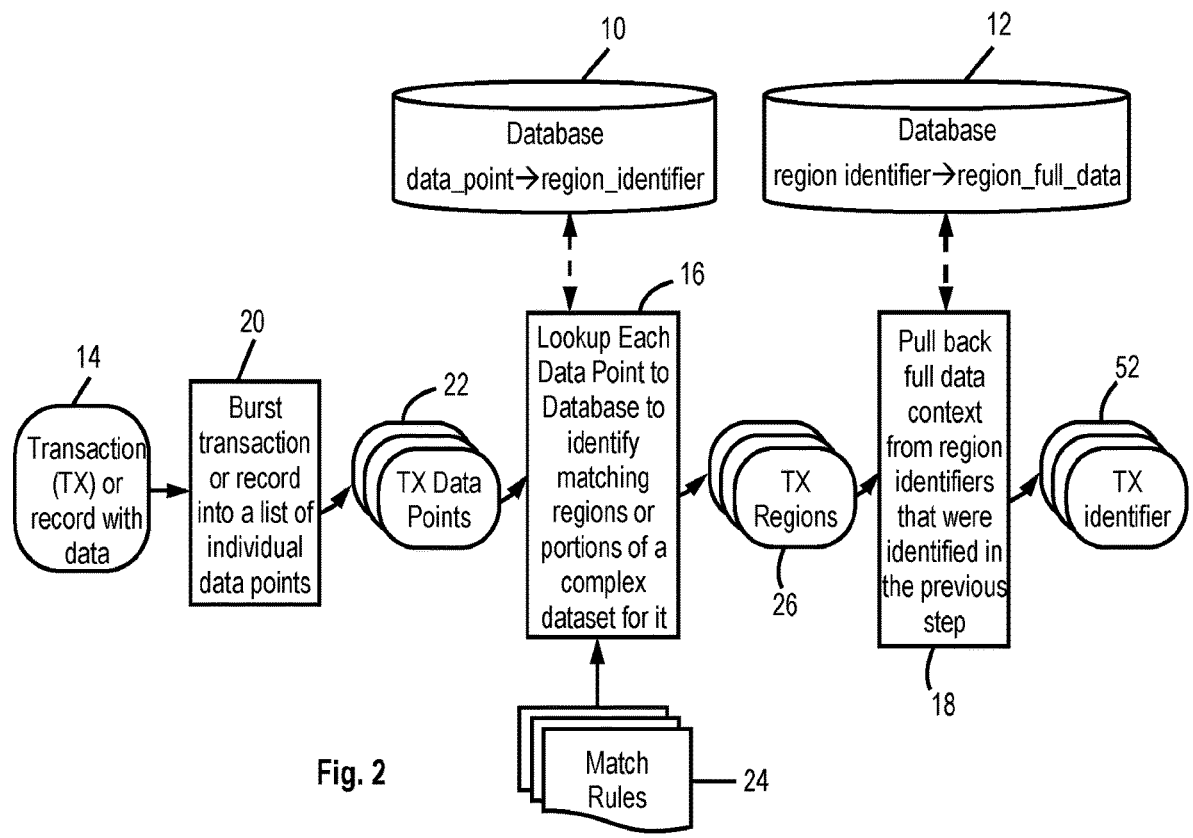
FIG. 2 is a detailed data flow architecture for an implementation of the present invention with bursting of a transaction or record into multiple data points.

FIG. 2 provides more detail than FIG. 1, illustrating how in certain implementations the present invention may be expanded in usability by "bursting" the incoming transaction or record. Given a transaction (TX) or a record with data to be matched at receive record step 14, the process breaks up that transaction and bursts it into multiple data points at burst step 20. Each data point in the TX database points set 22 is then matched against the value-to-location database 10 in order to find a region identifier that matches that data point at find identifier step 16. Matching proceeds according to a set of match rules 24. Matching may, in certain examples, not be limited to exact matches. It may, for example, cascade through a series of match rules from match rules 24 starting with exact matching, then Levenshtein distance and other "fuzzy" matching rules. This results in known localized region identifiers 26 being output by the match processes at find identifier step 16. These are then used to look up full contextual data from the complex data set database 12 at match search step 18. This results in full context data around the transactions that were first passed in. The result that is output is the matched data (output data and context) 52 desired from the operation.

Figure 3:
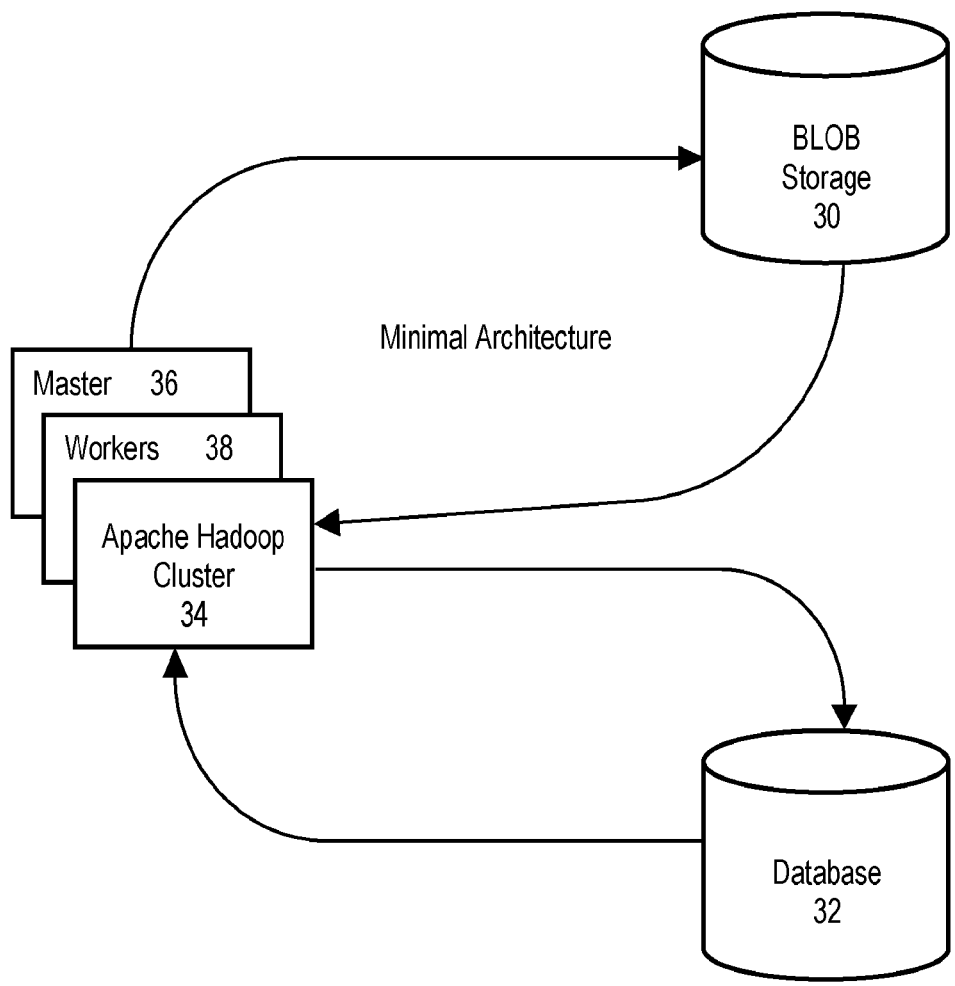
FIG. 3 is a high-level hardware architecture for an implementation of the present invention.
Figure 4:
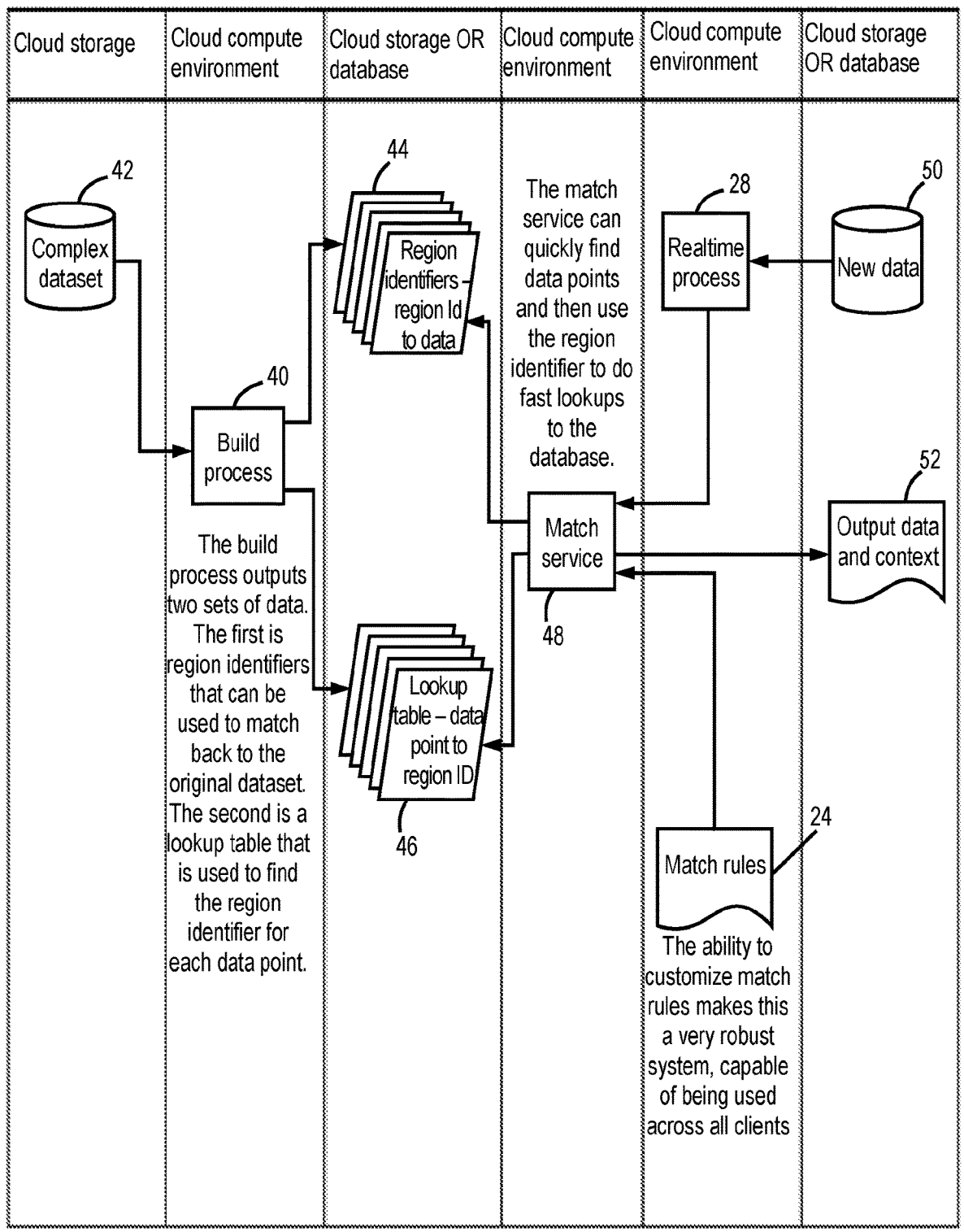
FIG. 4 is a swim lane diagram for an implementation of the present invention.

FIG. 4 provides a swim lane diagram of the processing of FIG. 3, but includes the build process 40 to create value-to-location database 10 and complex dataset database 12. The process begins at complex dataset 42, which is the original dataset before it is broken down into value-to-location database 10 and complex dataset database 12. Beginning with complex dataset 42, the build process outputs two sets of data. The first is region identifiers 44 that can be used to match back to the original dataset. The second is a lookup table 46 that may be used to find the region identifier for each data point in region identifiers 44. Match service in FIG. 3 is the functionality provided by burst step 20, find identifier step 16, and match search step 18 as detailed above. Match rules 24 similarly are used as described above. In certain embodiments there is a real-time process 28 that operates in conjunction with the batch mode operation described herein, wherein a match request can be performed in real time as needed using new data 50 as input to the real-time process 28. Regardless of whether the process is operating in real-time or batch mode, the results of the match request are returned at output data and context 52.

FIG. 3 illustrates the minimal hardware topology needed to operate this system at a high level. The flow in FIGS. 1 and 2 uses the bursting, lookup, and context processes within the context of a Hadoop Cluster shown in FIG. 3. The various constructed data sets live within the context of the BLOB storage 30, while the full complex dataset 42 may exist within database 32. The Hadoop cluster 34 shown in FIG. 3 provides for a cluster that minimally requires at least one master server 36 and at least one worker server 38. This hardware arrangement is configured for manipulating big data sets, and because of its flexible design is scalable to any size desired. This means that a minimal architecture like this would work to complete the process against a small dataset; however, at large data scales, the number of workers 38 would increase as well as the hardware requirements of those workers 38.

The default hardware requirements for processing 150 TB of data in the complex data set in one example would be as follows: one master node 36, with 8 CPU Cores, 52 GB main memory, and 512 GB of disk space; and 512 worker nodes 38, with a total of 16,384 CPU cores total needed at 32 cores per worker node, with 120 GB main memory per worker and 1200 GB of total disk space needed, allocated as 2×375 GB Local solid state drive (SSD) storage per worker and 450 GB local hard drive (HDD) storage per worker. As these are defaults, they can be lowered or increased to accommodate specific data sets, size, and increase or decrease of scale. In certain embodiments, the system requirements may be scaled up or down dynamically in response to the load on the system.

In one example, the system may be implemented in the Google Cloud framework. The BLOB storage 30 in that case would be Google Cloud Storage, and the Apache Hadoop clusters shown in FIG. 3. would be implemented on Google Cloud Platform Dataproc. The database 32 communication with the Apache Hadoop Clusters could be implemented as a Google Cloud BigTable. Many other implementations are possible, provided that there is storage media for two data stores (physically or virtually separated) and the ability to query the process to run on the data stores. Examples include Google BigQuery, MySQL, Postgres, Microsoft SQL Server, RocksDB, LevelDB, BadgerDB, Snowflake, Cassandra, Google Data Store, Mongo, AWS RDS, AWS DynamoDB, Apache Hive, Google Cloud Storage, and AWS S3. The system in various embodiments is not limited to particular software implementation languages; certain examples that may be used for implementation of the invention include Apache Hadoop, Apache Beam, Apache Spark, Apache Hive, Google BigQuery, Java, Python, Perl, C, Scala, and Apache PIG.

More generally, the systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, other mobile computing device, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™, or mobile computing device operating systems such as iOS™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included in the disclosure. All references cited herein are hereby incorporated by reference to the extent that there is no inconsistency with the disclosure of this specification. When a range is used herein, all points within the range and all subranges within the range are intended to be included in the disclosure.

The present invention has been described with reference to certain preferred and alternative implementations that are intended to be exemplary only and not limiting to the full scope of the present invention.

The invention claimed is:

1. A method for matching a transaction or record against a complex data set, comprising:
   receiving at a value-to-location database the transaction or record, wherein the transaction or record comprises at least one value and wherein the value-to-location database comprises a binary large object (BLOB) storage area;
   using a compute cluster comprising a master node server and at least one worker node server, wherein the compute cluster is in communication with the BLOB storage area in a cloud computing environment, bursting the transaction or record into a plurality of burst values, wherein bursting comprises a breaking up of the transaction or record into multiple data points, and wherein each burst value corresponds to a data point extracted from the transaction or record;

using the compute cluster, searching the value-to-location database for each of the plurality of burst values, and returning a location if a match is found to any of the plurality of burst values in the value-to-location database, wherein the searching cascades through a series of matching rules starting with exact matching and proceeding to fuzzy matching;

identifying a localized region of the complex data set corresponding to the returned location for each of the plurality of burst values;

searching each localized region of the complex data set for a match with at least one of the plurality of burst values;

processing the searching in both a batch mode and a parallel real-time mode, wherein the real-time mode operates in conjunction with the batch mode to perform match requests in real time using new data; and returning a plurality of records, wherein each of the plurality of records is matched to one of the plurality of burst values.

2. The method of claim 1, wherein the fuzzy matching is performed using Levenshtein distance measurement.

3. A system for matching data against a complex data set, comprising:
   a value-to-identifier data store, comprising a plurality of sets each comprising an identifier and a value, and wherein the value-to-identifier data store comprises a binary large object (BLOB) storage area;
   a complex data set, wherein the complex data set comprises a plurality of localized regions each assigned one of the plurality of identifiers, and wherein each of the plurality of localized regions comprise a plurality of data sets each comprising at least one record comprising at least one stored value;
   a compute cluster comprising a master node server and at least one worker node server, wherein the compute cluster is in communication with the BLOB storage area in a cloud computing environment, and wherein the computer cluster comprises a burst routine configured to receive an input transaction or input record and burst the input transaction or input record into a plurality of burst values by breaking up the transaction or input record into multiple data points;
   wherein the compute cluster further comprises a value-to-location routine configured to search the value-to-identifier data store for a value matching each of the plurality of burst values and return an identifier for each of the plurality of burst values from the plurality of sets each comprising an identifier and a value, wherein the value-to-location routine is configured to cascade through a series of match rules starting with exact matching and proceeding to fuzzy matching; and
   wherein the compute cluster further comprises a localized region search routine configured to identify a particular localized region of the complex data set corresponding to the identifier, search such particular localized region of the complex data set for a data value for each of the plurality of burst values, and return at least a portion of a matched record if a match is found in the localized region of the complex data set, wherein the localized region search routine is configured to process searches in both a batch mode and a parallel real-time mode, wherein the real-time mode operates in conjunction with the batch mode to perform match requests in real time using new data.

4. The system of claim 3, wherein the localized region search routine is further configured to search each identified localized region of the complex data set for each of the plurality of burst values.

5. The system of claim 4, wherein the localized region search routine is further configured to return at least a portion of a matched record if a match is found for each of the plurality of burst values.

6. The system of claim 3, wherein the value-to-location routine is further configured to search using Levenshtein distance measurement.

7. The method of claim 1, wherein a set of system requirements of the compute cluster are scaled dynamically based on a size of the complex data set.

8. The method of claim 1, wherein a set of system requirements of the compute cluster are scaled dynamically based on a number of burst values being processed.

9. The method of claim 1, wherein a set of system requirements of the compute cluster are scaled dynamically based on a current load on the system.

10. The method of claim 1, wherein a set of system requirements of the compute cluster are scaled dynamically based on a type of matching being performed.

11. The system of claim 3, wherein a set of system requirements of the compute cluster are scaled dynamically based on a size of the complex data set.

12. The system of claim 3, wherein a set of system requirements of the compute cluster are scaled dynamically based on a number of burst values being processed.

13. The system of claim 3, wherein a set of system requirements of the compute cluster are scaled dynamically based on a current load on the system.

14. The system of claim 3, wherein a set of system requirements of the compute cluster are scaled dynamically based on a type of matching being performed.

* * * * *